United States Patent
Simeone et al.

(10) Patent No.: US 6,497,112 B1
(45) Date of Patent: Dec. 24, 2002

(54) INTEGRATED POD SCROLL

(75) Inventors: Robert Stephen Simeone, Bridgeport, NY (US); Richie Charles Stauter, Fayetteville, NY (US); Yiming Yu, Syracuse, NY (US); David Christian Brondum, Cazenovia, NY (US)

(73) Assignee: Carrier Corporation, Farmington, CT (US)

( * ) Notice: Subject to any disclaimer, the term of this patent is extended or adjusted under 35 U.S.C. 154(b) by 0 days.

(21) Appl. No.: 09/934,965

(22) Filed: Aug. 22, 2001

(51) Int. Cl.[7] .................. F25D 17/04; F25D 19/00; F25D 3/08; B60H 1/32
(52) U.S. Cl. ................. 62/407; 62/298; 62/371; 62/239
(58) Field of Search .................. 62/239, 407, 298, 62/371

(56) References Cited

U.S. PATENT DOCUMENTS

| | | | | |
|---|---|---|---|---|
| 4,182,134 A | * | 1/1980 | Viegas et al. | 62/298 |
| 4,365,484 A | * | 12/1982 | Carson et al. | 62/239 |
| 4,424,684 A | * | 1/1984 | Waldschmidt et al. | 62/239 |
| 4,748,824 A | * | 6/1988 | Wakabayashi et al. | 62/239 |
| 4,802,342 A | * | 2/1989 | Gustafson et al. | 62/239 |
| 5,927,090 A | * | 7/1999 | Ladendorf et al. | 62/239 |
| 6,279,334 B1 | * | 8/2001 | Ishikawa et al. | 62/239 |
| 6,357,248 B1 | * | 3/2002 | Bongaards et al. | 62/263 |

* cited by examiner

Primary Examiner—William Doerrler
(74) Attorney, Agent, or Firm—Wall Marjama & Bilinski LLP

(57) ABSTRACT

A mobile temperature controlled container having an air conditioning unit that has an indoor section and an outdoor section. The indoor section includes a housing having a rectangular shaped frame, the front face of which is secured to one wall of the container and a rear wall that is secured to the back of the frame. The rear wall is molded of a suitable plastic and contains a blower wheel compartment and a heat exchanger compartment containing a heat exchanger coil. Both compartments open into the frame and a generous flow path area is provided in the top section of the heat exchanger compartment over the coil so that return air from the container that is drawn into housing can move freely into the blower wheel compartment. The blower wheel compartment is enclosed by a cover having an air inlet opening adjacent the blower wheel and further includes a discharge nozzle that exhausts into the container.

8 Claims, 6 Drawing Sheets

INTEGRATED POD SCROLL

FIELD OF THE INVENTION

This invention relates to a mobile container and, in particular, to an air conditioning unit for controlling the temperature within the container.

BACKGROUND OF THE INVENTION

Mobile temperature controlled containers are used to transport a wide variety of perishable or heat sensitive goods. The containers are serviced by air conditioning units that are capable of supplying heated or cooled air to the container needed to preserve the cargo that is in transit. The air conditioning systems employed in association with a mobile container are typically split into an outdoor section that is exposed to ambient air and an indoor section that houses the equipment for conditioning return air drawn from the container and returning the conditioned air to the container. Because of space constraints that are placed upon this type of air conditioning system, efficient movement of air throughout the indoor section of the air conditioning system is difficult to attain. This, in turn, results in an increase in air pressure resistance on the outdoor side of the system with a corresponding increase in power consumption. In addition, the indoor section of many air conditioning units for cooling or heating mobile containers are contained in housings having a relatively high thermal conductivity whereby heat can pass into and out of the housing at a relative high rate placing an additional burden on the air conditioning unit.

SUMMARY OF THE INVENTION

It is, therefore, a primary object of the present invention to improve air conditioning units for use in mobile containers for transporting perishable goods.

It is another object of the present invention to reduce the air pressure resistance on the outdoor side of an air conditioning system of a mobile container.

It is a still further object of the present invention to improve air management on the indoor side of an air conditioning system of a mobile container.

Yet another object of the present invention is to minimize the transfer of heat into and out of the indoor section of an air conditioning system used in a mobile temperature controlled container.

Still another object of the present invention is to reduce the power consumption of an air conditioning system of a mobile temperature controlled container.

These and other objects of the current invention are attained in a mobile temperature controlled container having an air conditioning unit consisting of an indoor section and an outdoor section. The indoor section of the unit further includes a rectangular frame having opposed side walls and a top wall and a bottom wall. The front of the frame is secured to one wall of the container and the back of the frame is closed for means of a molded rear wall that contains a blower wheel compartment and a heat exchanger compartment both of which open into the frame. The blower wheel compartment further includes a scroll-shaped section for housing a blower wheel and a discharge section into which the blower wheel discharges. The heat exchanger compartment is located beneath the blower compartment and has a lower section that houses a portion of the indoor heat exchanger coil and an upper section having a contoured rear wall for directing air drawn through the coil by the blower into the frame area. The blower compartment is closed by a cover containing an inlet located adjacent to the blower and which communicates with the interior of the frame. The cover also includes a nozzle that is positioned adjacent to the discharge section of the blower compartment and which passes into the container.

BRIEF DESCRIPTION OF THE DRAWING

For a better understanding of these and other objects of the present invention, reference will be made to the detailed description of the invention below which is to be read in association with the accompanying drawings, wherein.

DETAILED DESCRIPTION OF THE INVENTION

Figure 1:
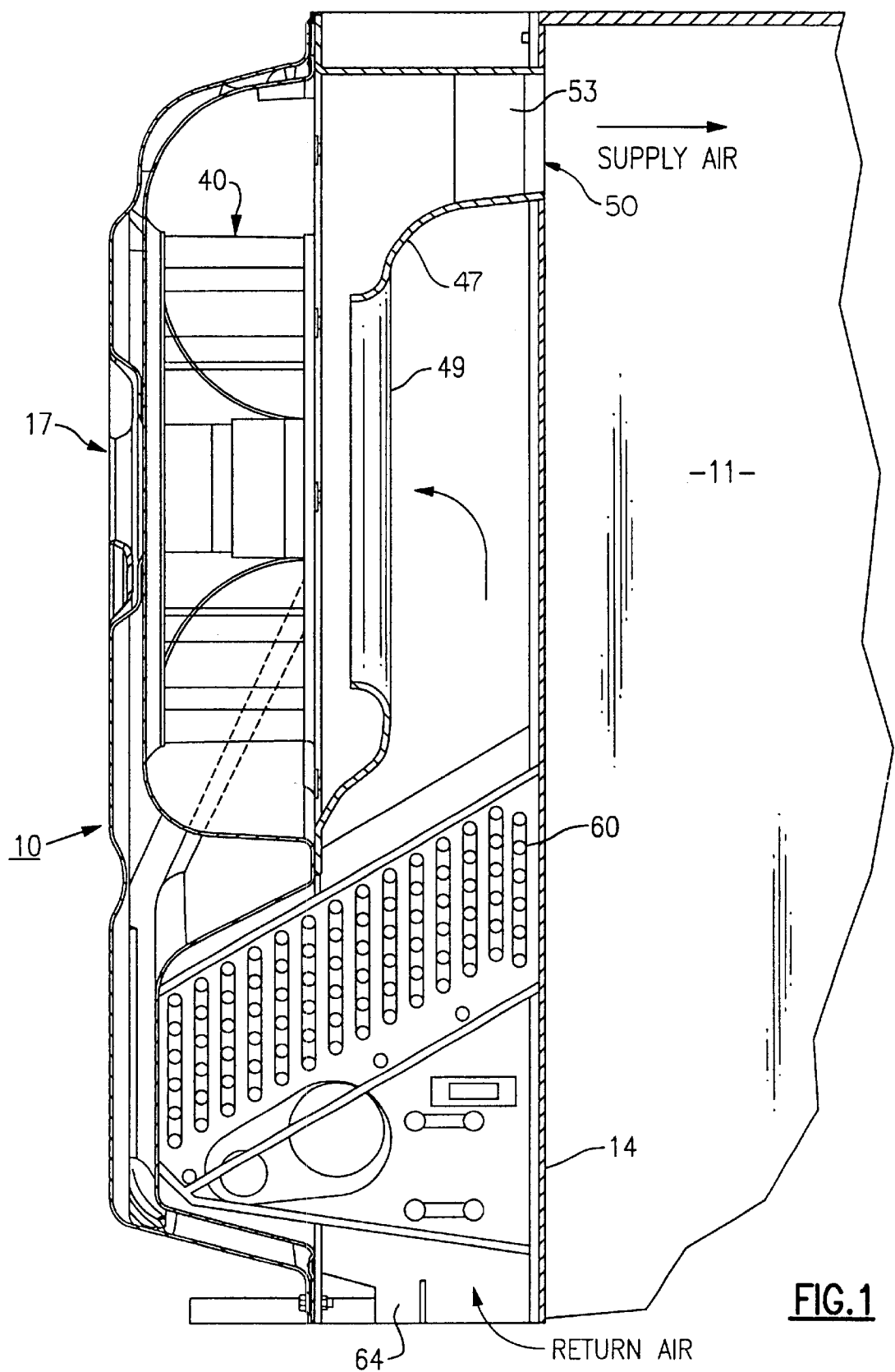
FIG. 1 is an enlarged side view of the indoor section of an air conditioning unit for servicing a mobile temperature controlled container.
Figure 2:
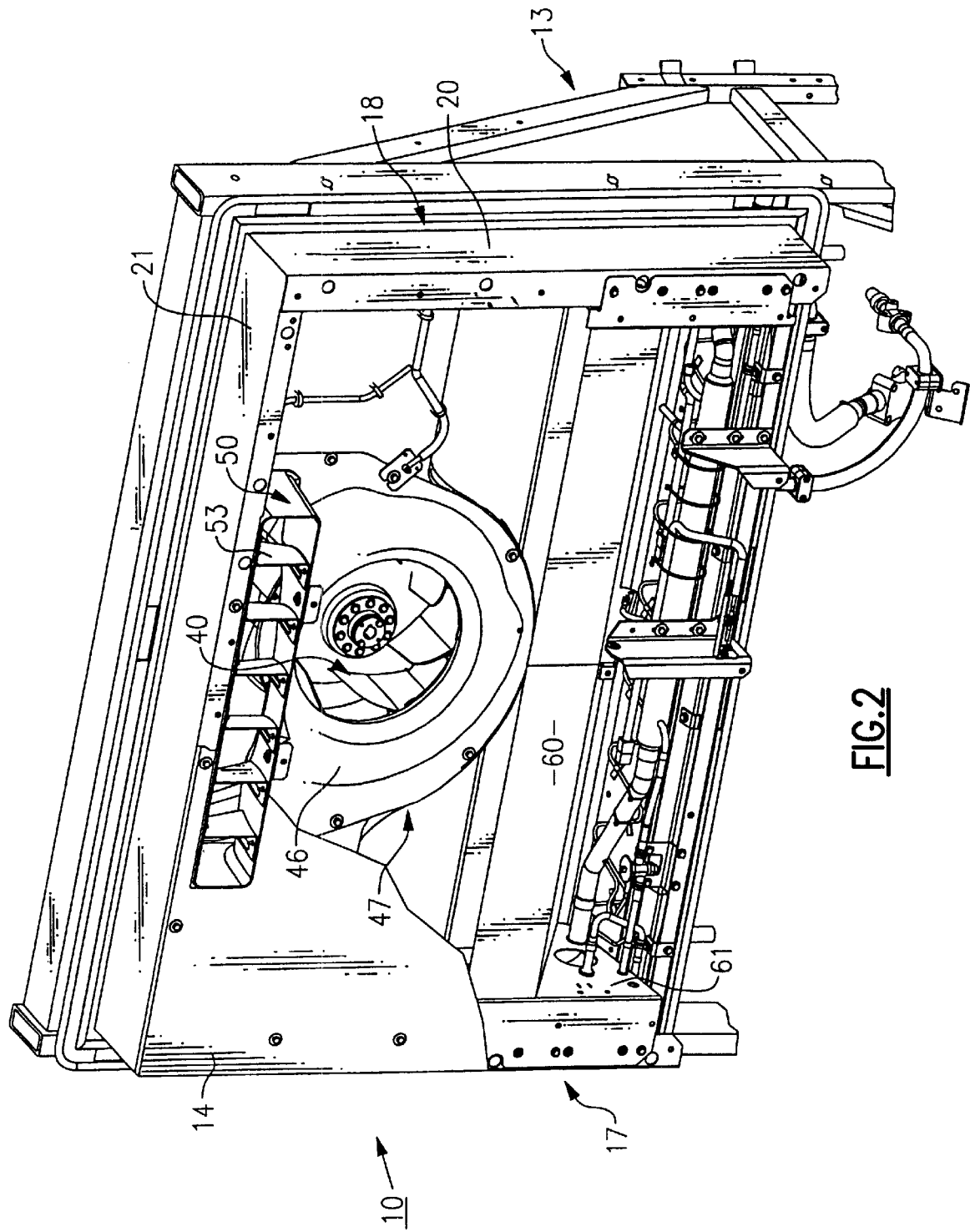
FIG. 2 is a rear perspective view of the indoor section of the air conditioning unit.
Figure 3:
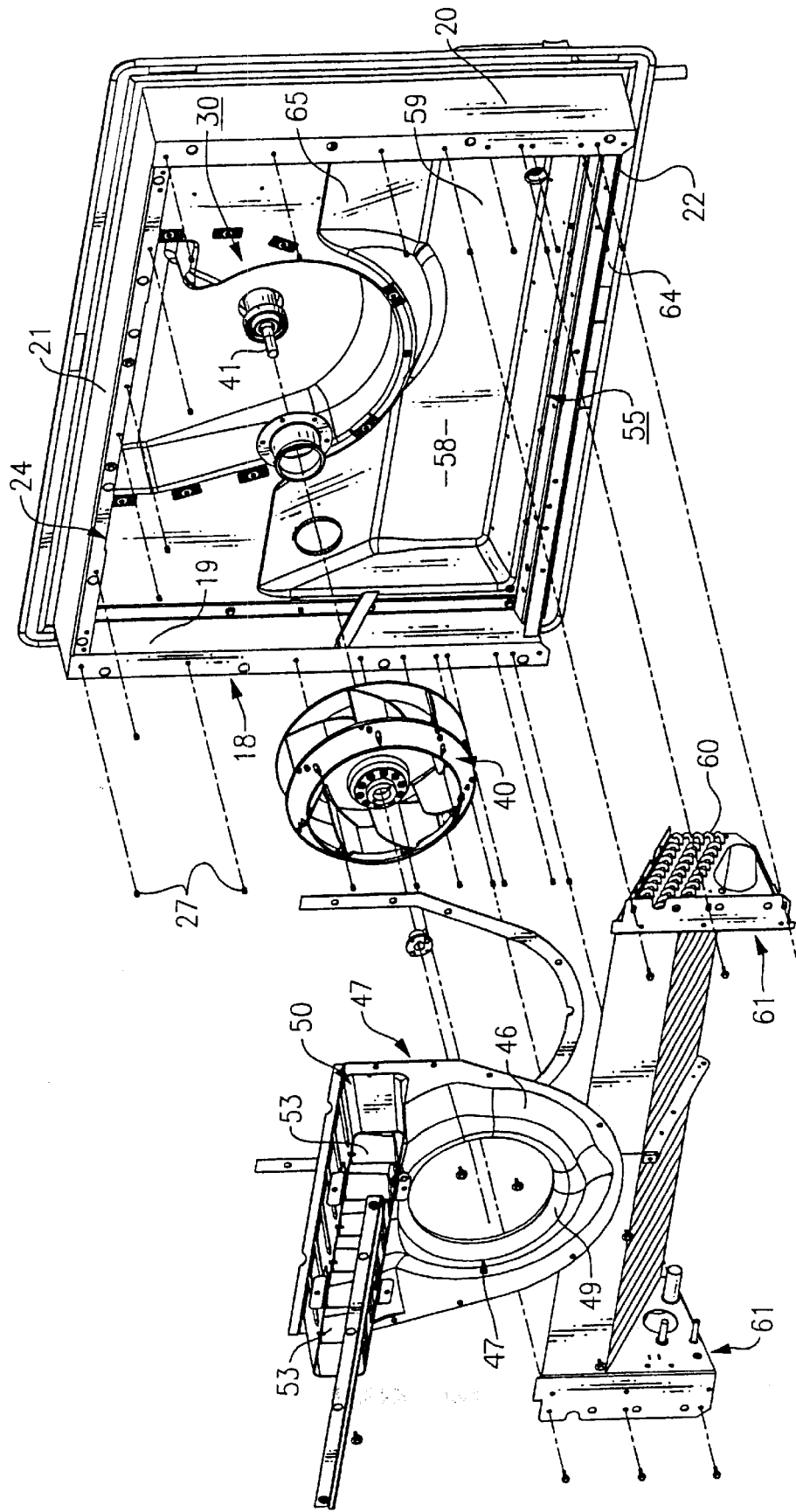
FIG. 3 is an exploded view in perspective showing various components of the indoor section.

Referring initially to FIGS. 1–3, there is illustrated the indoor section 10 of an air conditioning system for providing conditioned air to the interior of the temperature controlled mobile container 11 (FIG. 1). Depending upon the cargo carried in the container, the conditioned air delivered by the indoor section may be either heated or cooled to preserve the cargo as it is being transported. The air conditioning unit which is not shown in its entirety is supported in a mounting bracket 13 (FIG. 2) generally located adjacent to the front wall 14 of the container. The air conditioning components making up the outdoor section of the unit are housed in the open framework of the bracket while the components making up the indoor section of the unit are contained within a housing generally referenced 17.

As best illustrated in FIG. 3, the housing includes a rectangular frame, generally referenced 18, having opposed side walls 19 and 20 and top and bottom walls 21 and 22, respectively. The back of the frame is closed by a rear wall 24 that is secured to the frame by threaded fasteners or the like. A gasket (not shown) is placed between the rear wall and the frame to render the joint therebetween air tight. As will be explained in greater detail below, the rear wall contains a pair of compartments that open into the interior area of the frame. The front face of the frame is secured against one wall of the container, preferably the front wall, by means of threaded fasteners 27. A gasket is also interposed between the wall of the container and the frame to again provide an air tight joint therebetween.

The rear wall 24 of the housing 17 is preferably molded from a high strength plastic material having low thermal conductivity so that the wall forms a barrier to heat, thus prohibiting the flow of heat into or out of the indoor section of the air conditioning unit. The frame is also fabricated of a similar material thereby insulating the entire housing against the transfer of heat through the housing walls.

Figure 4:
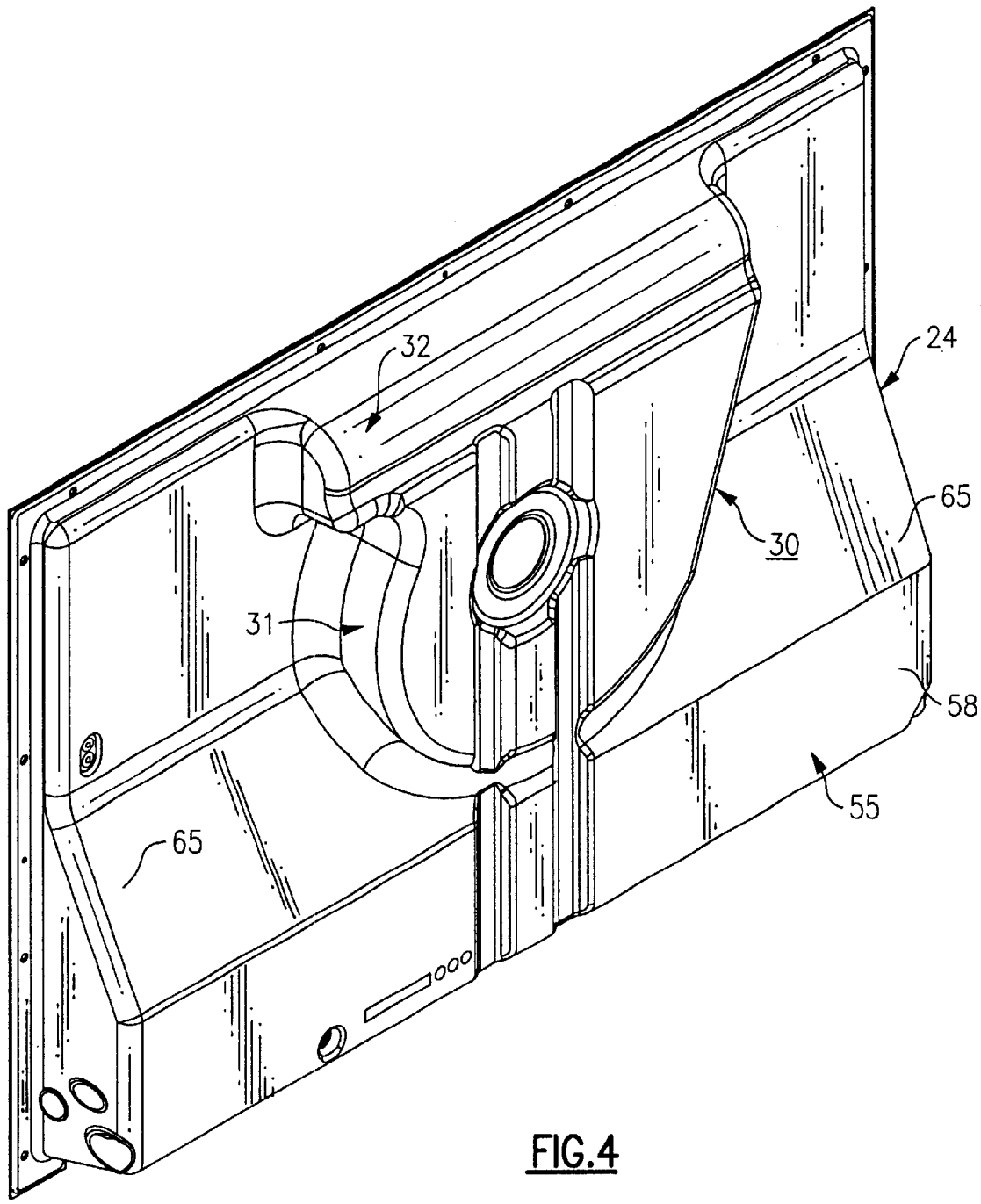
FIG. 4 is a perspective view illustrating the rear cover of the outdoor section.
Figure 5:
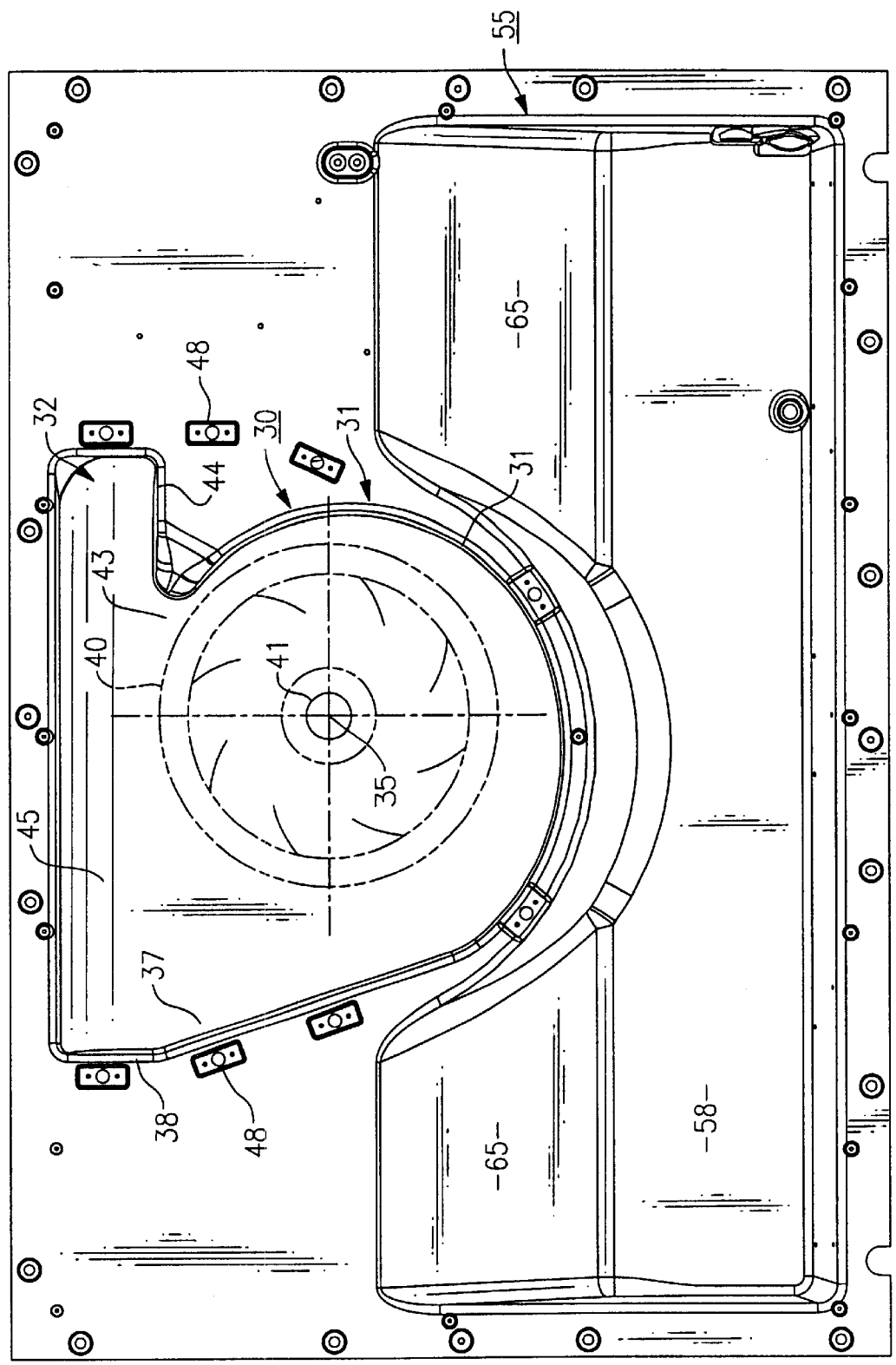
FIG. 5 is an elevational view of the rear cover of the indoor section of the unit.
Figure 6:
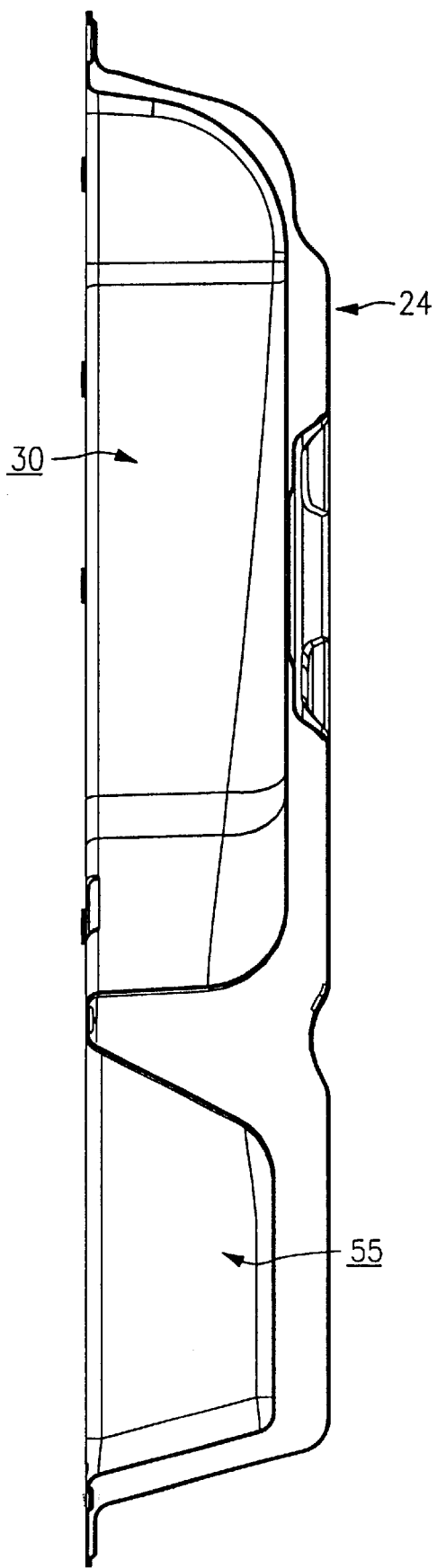
FIG. 6 is an enlarged side view in a section of the rear wall of the outdoor section of the air conditioning unit.

With further reference to FIGS. 4–6, the rear wall 24 of the housing contains a blower wheel compartment 30 that has a scroll-shaped lower section 31 that empties into a rectangular-shaped upper section 32. As illustrated in FIG. 5, the scroll section has a spiral-shaped wall 33 with the center of rotation of the spiral being located at 35. The spiral enters the discharge section of the compartment at about the one o'clock position and rotates in a clockwise direction as viewed in FIG. 5 through about 180° to 210°. The spiral is joined to an upwardly directed linear wall 37 which again enters the discharge section of the compartment at the end wall 38 thereof. A blower wheel 40 is mounted for rotation upon a shaft 41 that is coaxially aligned with the axis of rotation of the spiral. The wheel rotates in a clockwise direction and forms a narrow cutoff or entrance region 43 with the lower wall 44 of the discharge chamber and a wide exit region 45 through which the blower delivers air into the discharge section of the blower wheel compartment.

The open side of the blower wheel compartment that faces the frame is closed by a cover 47. The cover is secured to the inside of the rear wall 24 of the housing using screws which are threaded into lugs 48 that are cast into the wall about the outer periphery of the blower wheel compartment. As illustrated in FIG. 3, the cover has a flat body 46 that contains a circular opening 49 located adjacent to the blower wheel through which air from inside the frame is drawn into the blower wheel compartment. The cover further includes a rectangular-shaped outlet nozzle 50 that is arranged in assembly to pass into the interior of the container through the front wall thereof. The nozzle is located adjacent to the discharge section of the blower wheel compartment and contains a series of deflector plates 53 that are used to uniformly distribute the air flow passing through the nozzle throughout the container.

A second heat exchanger compartment generally referenced 55 is also molded into the rear wall so that the upper part of the compartment encircles the lower part of the blower wheel compartment as illustrated in FIGS. 1–5, the heat exchanger compartment has a lower section 58 containing a vertical back wall 59 that houses a portion of the indoor heat exchanger coil 60. The floor of the heat exchanger compartment is coplanar with that of the frame. The coil is supported in a mounting fixture 61 so that the coil is placed at an angle within the indoor housing immediately above an air inlet 64 to the housing. The air inlet extends across the bottom wall 24 of the frame through which return air from the container is drawn into the housing by the blower wheel.

The upper part of the heat exchanger compartment has an inwardly inclined contoured rear wall 65 that directs conditioned air drawn through the heat exchanger coil back into the frame area around the cover to the blower wheel compartment. As best shown in FIG. 1, a generous air space is established above the heat exchanger coil so that the conditioned air leaving the heat exchanger can move freely into the blower wheel compartment. This free movement of conditioned air into the blower wheel compartment causes a reduction in the air pressure resistance on the outdoor section of the air conditioning unit resulting in a reduction in power consumption.

Under the influence of the blower wheel, the conditioned air is moved into the discharge chamber 32 of the blower wheel compartment and directed into the container through the outlet nozzle 50. As noted above, the nozzle contains a series of deflector vanes that are tuned so that the supply air flow has improved air throw properties and a more uniform distribution when compared to similar systems found in the prior art.

While the present invention has been particularly shown and described with reference to the preferred mode as illustrated in the drawing, it will be understood by one skilled in the art that various changes in detail may be effected therein without departing from the spirit and scope of the invention as defined by the claims.

We claim:

1. In a mobile temperature controlled container having an air conditioning unit that includes an indoor section and an outdoor section, wherein said indoor section further includes:

a rectangular frame having opposed side walls, a top and a bottom wall, the walls having front edges for forming a front face of the frame and rear edges forming the back face of the frame, a rear wall for closing the back face of said frame that includes an open ended blower wheel compartment and an open ended heat exchanger compartment, both compartments being arranged to open into the area bounded by the frame walls, said blower wheel compartment having a scroll shaped wall that partially encloses a blower wheel for moving return air from the container through the indoor section of the air conditioning unit to establish a flow that empties into a horizontally disposed discharge chamber located over the blower wheel, a cover mounted over the open end of said blower wheel compartment that contains an inlet opening for conducting air axially into said blower wheel, a heat exchanger for conditioning air moving through said indoor section, said heat exchanger being partially contained within said frame and partially contained within the heat exchanger compartment, said heat exchanger compartment having a contoured wall for directing conditioned air to said inlet opening, and means for closing the front face of said frame against a wall of said container.

2. The indoor section of claim 1 wherein said frame and said rear wall for closing said frame are both molded of a material having a low thermal conductivity.

3. The indoor section of claim 1 wherein said cover further contains an outlet nozzle that communicates with the discharge chamber of the blower wheel compartment, said outlet nozzle being arranged to direct conditioned air back into the container.

4. The indoor section of claim 3 wherein said outlet nozzle further contains deflector means for distributing the flow of conditioned air.

5. The indoor section of claim 1 that further contains a return air inlet to said indoor section that is located in the bottom wall of the frame.

6. The indoor section of claim 1 wherein the scroll shaped wall of the blower compartment has a center of rotation located about on the axis of rotation of the blower wheel.

7. The indoor section of claim 1 wherein said contoured wall of said heat exchanger compartment includes a vertically disposed lower section and an oblique upper section.

8. The indoor section of claim 7 wherein said heat exchanger is mounted in the housing at an oblique angle that about equal to the oblique angle of the upper section of said contoured wall.

* * * * *